United States Patent
Lee et al.

(10) Patent No.: US 8,537,923 B2
(45) Date of Patent: Sep. 17, 2013

(54) APPARATUS AND METHOD FOR DETERMINING MODULATION AND CODING SCHEME FOR ADAPTIVE MODULATION AND CODING SCHEME IN MULTIPLE INPUT MULTIPLE OUTPUT SYSTEM

(75) Inventors: Inkyu Lee, Seoul (KR); Ji-Hoon Kim, Seoul (KR); Kyong-Jae Lee, Daejeon (KR); Chang Kyung Sung, Sydney (AU)

(73) Assignee: Korea University Industrial & Academic Collaboration Foundation, Seoul (KR)

( * ) Notice: Subject to any disclaimer, the term of this patent is extended or adjusted under 35 U.S.C. 154(b) by 779 days.

(21) Appl. No.: 12/693,767

(22) Filed: Jan. 26, 2010

(65) Prior Publication Data

US 2011/0129028 A1    Jun. 2, 2011

(30) Foreign Application Priority Data

Nov. 30, 2009    (KR) .................. 10-2009-0116748

(51) Int. Cl.
*H04B 7/02*    (2006.01)
(52) U.S. Cl.
USPC ........... 375/267; 375/260; 375/259; 375/295; 375/316
(58) Field of Classification Search
USPC ................... 375/267, 260, 259, 295, 316
See application file for complete search history.

(56) References Cited

U.S. PATENT DOCUMENTS

| | | |
|---|---|---|
| 7,817,741 B2 | 10/2010 | Hayase et al. |
| 2003/0228850 A1 | 12/2003 | Hwang |
| 2010/0014500 A1 | 1/2010 | Lee et al. |

FOREIGN PATENT DOCUMENTS

| | | |
|---|---|---|
| JP | 2007-306446 A | 11/2007 |
| KR | 10-0548311 B1 | 2/2006 |
| KR | 10-2008-0084588 A | 9/2008 |
| KR | 10-2009-0061881 A | 6/2009 |

OTHER PUBLICATIONS

Kim et al. A Simple SNR Representation Method for AMC Chemes of MIMO Systems with ML Detector, Oct. 2009, IEEE, VVol 57, pp. 2971-2976.*
Korean Decision on Grant issued Sep. 30. 2011, in counterpart Korean Application No. 10-2009-0116748 (5 pages).

* cited by examiner

*Primary Examiner* — Zewdu Kassa
(74) *Attorney, Agent, or Firm* — NSIP Law

(57) ABSTRACT

A method and apparatus is provided for determining a modulation and coding scheme in a Multiple Input Multiple Output system with a Maximum Likelihood Detector (MIMO-MLD), in which an upper bound and a lower bound of a Signal to Noise Ratio (SNR) for the MIMO-MLD are determined, an effective Signal to Noise Ratio (eSNR) is computed using a relation between the upper bound and the lower bound, a channel quality is estimated using the eSNR, and a modulation and coding scheme is determined using the estimated channel quality.

17 Claims, 5 Drawing Sheets

APPARATUS AND METHOD FOR DETERMINING MODULATION AND CODING SCHEME FOR ADAPTIVE MODULATION AND CODING SCHEME IN MULTIPLE INPUT MULTIPLE OUTPUT SYSTEM

CROSS-REFERENCE TO RELATES APPLICATION(S)

This application claims the benefit under 35 U.S.C. §119 (a) of a Korean Patent Application filed in the Korean Intellectual Property Office on Nov. 30, 2009 and assigned Serial No. 10-2009-0116748, the entire disclosure of which is hereby incorporated by reference for all purposes.

BACKGROUND OF THE INVENTION

1. Field of the Invention

The present invention relates generally to a wireless communication system using multiple antennas, and more particularly, to an apparatus and method for determining a modulation and coding scheme for Adaptive Modulation and Coding (AMC) in a multi-antenna system improving the link performance.

2. Description of the Related Art

Nowadays, many wireless communication technologies have been proposed as candidates to support high-speed mobile communications. Among them, Orthogonal Frequency Division Multiplexing (OFDM) is a sort of multi-carrier modulation scheme, and is now recognized as the most promising next-generation mobile communication technology.

OFDM is a modulation scheme that converts a serial input symbol stream in parallel and modulates the parallel-converted symbol streams using orthogonal subcarriers during transmission. OFDM may be widely applied to digital transmission technologies for high-speed data transmission, including Wireless Internet, Digital Audio Broadcasting (DAB), Digital Multimedia Broadcasting (DMB), and Wireless Local Area Network (WLAN).

The OFDM system has been designed to support high-speed packet data transmissions, and high-speed packet data services may be obtained by efficiently using the transmission bandwidth and by mitigating inter-symbol interference caused by frequency selective fading channels. In addition, the OFDM system makes it possible to transmit packets over frequency selective channels without equalizers.

A Multiple Input Multiple Output (MIMO) system, also known as a multi-antenna system, may provide a significant throughput gain over single-antenna systems by transmitting multiple independent data streams.

Therefore, the recent wireless communication systems have developed into MIMO-OFDM systems provided by combining the MIMO technology with the OFDM technology. The MIMO-OFDM system may guarantee high spectral efficiency and better link error performance by associating with Bit-Interleaved Coded Modulation (BICM).

Meanwhile, an Adaptive Modulation and Coding (AMC) technique is a technology by which a transmitter enhances the link performance by adjusting the transmit power level, channel coding rates and/or modulation orders (or modulation levels) based on the current Channel State Information (CSI). That is, the AMC technique increases throughput (or data rate) in the good channel state and decreases throughput in case of the channel degradation to support efficient data transmission, thus making it possible to increase average throughput. Therefore, a receiver needs a method for accurately estimating and feeding back the link-level performance in a given channel environment.

A combined technology of the MIMO system and the AMC technique differs in the difficulty of its realization according to a type of the receiver in the system.

In MIMO systems with linear equalizers, signal restoration through individual estimation is possible even for the data that is simultaneously transmitted as it is converted into the mathematically same single-antenna signals due to the linear equalizers. That is, if inter-signal interference is cancelled by the linear equalizer, the MIMO system may be considered as a single-antenna system, so the MIMO system may use the link performance estimation technique used in the single-antenna system. Hence, a MIMO system with a linear equalizer may employ the AMC scheme used in the single-antenna system without any difficulty.

However, since a receiver with a linear equalizer is not an optimal receiver in terms of data estimation, the receiver may suffer from performance degradation. Therefore, the MIMO system should use a maximum likelihood detector, which is a nonlinear equalizer, for optimal data estimation.

The maximum likelihood detector exhibits the excellent detection performance compared to the receiver with a linear equalizer, as it simultaneously estimates the received data. Undesirably, however, the maximum likelihood detector may not employ the AMC technique used in the single-antenna system due to its simultaneous data estimation. Therefore, there is a need for a scheme to efficiently apply the AMC technique in the MIMO system with the maximum likelihood detector.

SUMMARY OF THE INVENTION

An aspect of the present invention is to address at least the above-mentioned problems and/or disadvantages and to provide at least the advantages described below. Accordingly, an aspect of the present invention provides an apparatus and method for determining an adaptive modulation and coding scheme according to a channel state in a MIMO system with a Maximum Likelihood Detector (MIMO-MLD).

Another aspect of the present invention provides an apparatus and method for estimating a channel quality for Adaptive Modulation and Coding (AMC) in MIMO-MLD.

In accordance with one aspect of the present invention, there is provided a method for determining a modulation and coding scheme in a Multiple Input Multiple Output system with a Maximum Likelihood Detector (MIMO-MLD), in which an upper bound and a lower bound of a Signal to Noise Ratio (SNR) for the MIMO-MLD are determined, an effective Signal to Noise Ratio (eSNR) is computed using a relation between the upper bound and lower bound, a channel quality is estimated using the eSNR, and a modulation and coding scheme is determined using the estimated channel quality.

In accordance with another aspect of the present invention, there is provided an apparatus for determining a modulation and coding scheme in a Multiple Input Multiple Output system with a Maximum Likelihood Detector (MIMO-MLD), in which a channel quality estimator determines an upper bound and a lower bound of a Signal to Noise Ratio (SNR) for the MIMO-MLD, computes an effective Signal to Noise Ratio (eSNR) using a relation between the upper bound and the lower bound, and estimates a channel quality using the eSNR, and a controller determines a modulation and coding scheme using the estimated channel quality.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

An exemplary embodiment of the present invention provides a technique for estimating a channel quality for AMC in a MIMO system with a Maximum Likelihood Detector (MLD). The term "channel quality" as used herein refers to a channel state or link-level performance.

There are many different techniques for estimating the channel quality, and among them, an Exponential Effective SIR Mapping (EESM) technique provides a simple and accurate estimation method. However, since the EESM technique has been originally proposed for a Single-Input Single-Output (SISO) system, also known as a single-antenna system, it may not be easily applied to the MIMO system.

The EESM technique may be complicated depending on a receiver structure of the MIMO system. If linear equalizers such as Zero-Forcing (ZF) or Minimum Mean Square Error (MMSE) filters are used in the MIMO systems, the EESM technique may be directly applied to the MIMO system since parallel spatial subchannels generated by the linear receiver may be considered as independent SISO channels.

However, in case of a MIMO system with an MLD which is a nonlinear equalizer (hereinafter referred to as a "MIMO-MLD system"), it is very difficult to estimate the link performance based on the EESM technique since the received signal should be jointly detected over all spatial subchannels.

Therefore, an exemplary embodiment of the present invention provides a channel quality estimation technique based on the EESM technique to determine a modulation and coding scheme for AMC in the MIMO-MLD system.

Exemplary embodiments of the present invention will be described below with reference to accompanying drawings.

Figure 1:
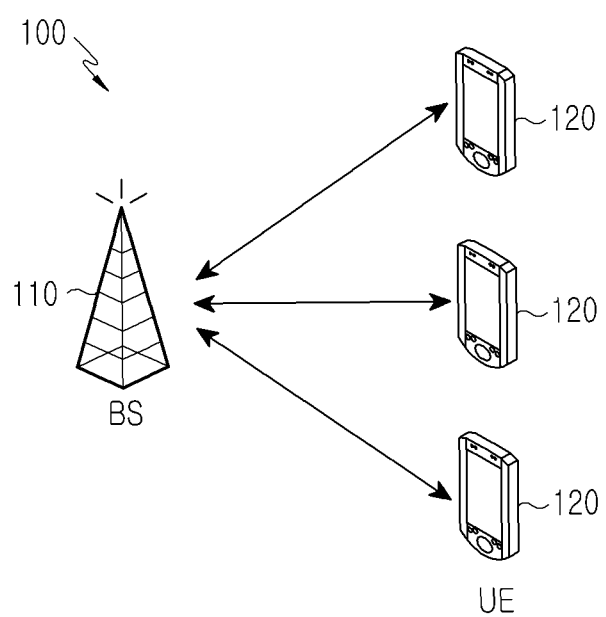
FIG. 1 shows a configuration of a general wireless communication system.

FIG. 1 shows a configuration of a general wireless communication system.

Referring to FIG. 1, a wireless communication system 100 includes a Base Station (BS) 110 and a plurality of User Equipments (UEs) 120. The wireless communication system 100 is widely used to provide a variety of communication services such as a voice service and a packet data service.

The BS 110 generally refers to a fixed station that communicates with the UEs 120, and may be referred to as other terminologies such as a Node-B and a Base Transceiver System (BTS). On the other hand, the UEs 120 may be fixed or have mobility, and may also be referred to other terminologies such as a Mobile Station (MS), a User Terminal (UT), a Subscriber Station (SS), and a wireless device.

Herein, a downlink means communication from the BS 110 to the UEs 120, and an uplink means communication from the UEs 120 to the BS 110. In the downlink, a transmitter may be part of the BS 110 while a receiver may be part of the UE 120. In contrast, in the uplink, a transmitter may be part of the UE 120 while a receiver may be part of the BS 110. The BS 110 may include multiple receivers and multiple transmitters, and the UE 120 may also include multiple receivers and multiple transmitters.

Figure 2:
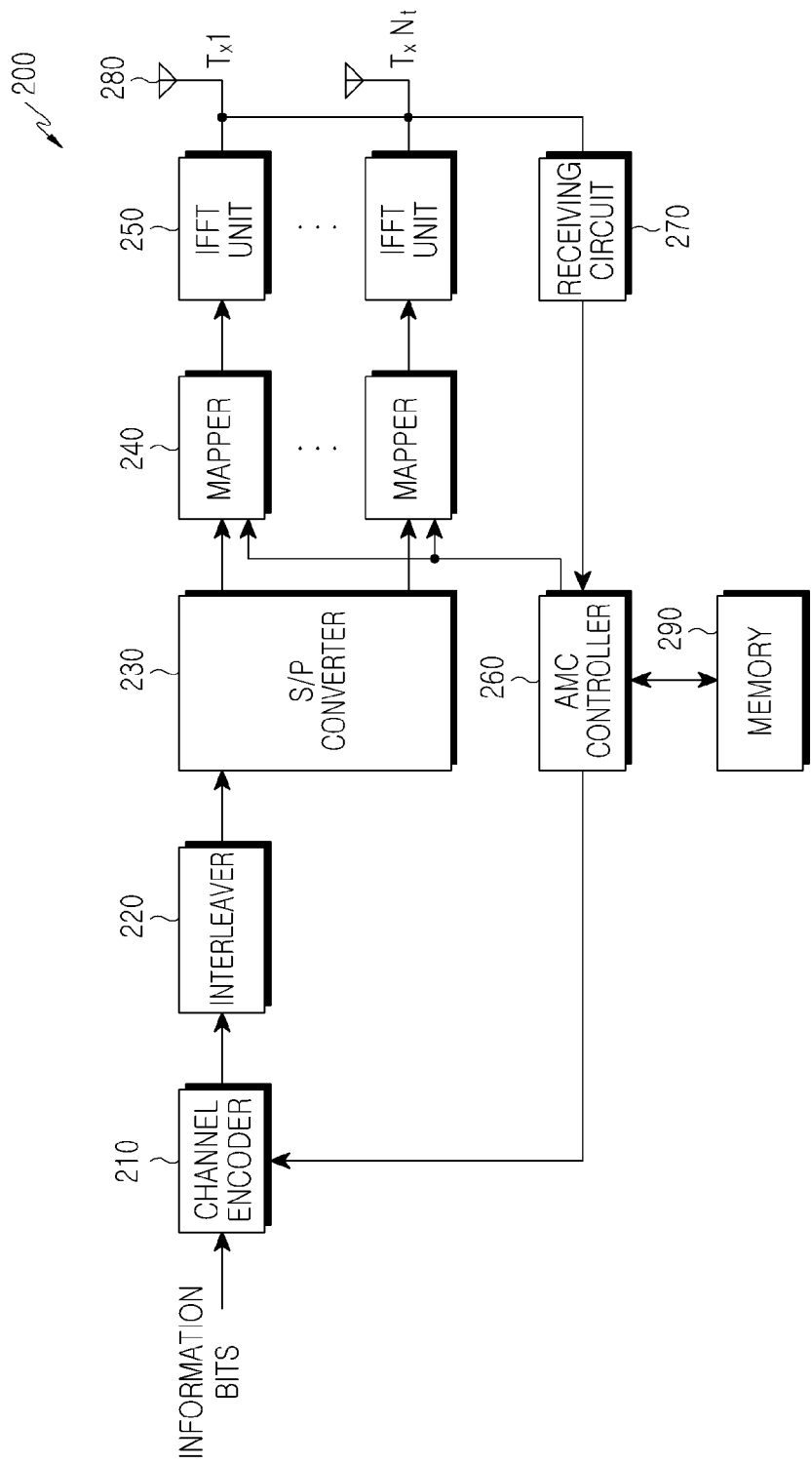
FIG. 2 shows a structure of a BS in a MIMO-OFDM system according to an embodiment of the present invention.

FIG. 2 is a block diagram showing a BS in a MIMO-OFDM system according to an embodiment of the present invention.

Referring to FIG. 2, a BS 200 includes a channel encoder 210, an interleaver 220, a Serial-to-Parallel (S/P) converter 230, mappers 240, Inverse Fast Fourier Transform (IFFT) units 250, an AMC controller 260, a receiving circuit 270, multiple antennas 280, and a memory 290. Other components of the BS 200, which are not related to the present invention, will be omitted herein for simplicity.

An embodiment of the present invention provides a method for determining an AMC scheme based on a vertical encoding MIMO system that simultaneously encodes multiple data streams using one channel encoder.

The channel encoder 210 forms coded data (or coded word) by encoding an input information stream according to a predetermined coding scheme. The channel encoder 210 adds error detection bits such as Cyclic Redundancy Check (CRC) to the information stream, and may add extra codes for error correction. The channel encoder 210 may use a convolution code or a turbo code as an error correction code. However, a Rate Compatible Punctured Convolution (RCPC) code may be used in an embodiment of the present invention by way of example. The interleaver 220 interleaves the coded data to minimize burst errors.

The S/P converter 230 converts a serial signal output from the interleaver 220 into parallel signals. The mappers 240 provides modulation symbols by modulating an interleaved and coded signal corresponding to each of the parallel signals converted by the S/P converter 230, according to a predetermined modulation scheme. That is, the coded data is mapped by the mappers 240 to the modulation symbols expressing amplitudes and positions on the constellation. A modulation scheme in the mappers 240 is not limited, and m-Phase Shift Keying (m-PSK) or m-Quadrature Amplitude Modulation (m-QAM) may be used.

The IFFT units 250 perform IFFT on the modulation symbols output from the mappers 240 to convert them into time-domain samples. Cyclic Prefix (CP) inserters (not shown) add a CP, or a guard interval, into the time-domain samples. The CP is used to convert frequency selective channels into flat-fading channels by canceling inter-symbol interference. Signals output from the CP inserters are converted into analog signals and then transmitted via the multiple antennas 280.

The receiving circuit 270 receives a signal transmitted from the UE 120 via the multiple antennas 280. The receiving circuit 270 digitalizes the received signal and outputs the digitalized signal to the AMC controller 260.

The AMC controller 260 determines a Modulation and Coding Scheme (MCS) level based on the channel quality information provided from the UE 120. The channel quality information may include a Signal to Interference Ratio (SIR) or an index of an MCS level. The AMC controller 260 provides a coding scheme to the channel encoder 210 and a modulation scheme to the mappers 240 according to the determined MCS level.

The memory 290 may store a look-up table with respect to indices of the MCS levels. An example of the MCS look-up table is as shown in Table 1 below.

TABLE 1

| Index | Modulation | Coding Rate |
|---|---|---|
| 1 | QPSK | 1/3 |
| 2 | QPSK | 1/2 |
| 3 | QPSK | 2/3 |
| 4 | QPSK | 3/4 |
| 5 | 16QAM | 1/3 |
| 6 | 16QAM | 1/2 |
| 7 | 16QAM | 2/3 |
| 8 | 16QAM | 3/4 |
| 9 | 64QAM | 1/3 |
| 10 | 64QAM | 1/2 |
| 11 | 64QAM | 2/3 |
| 12 | 64QAM | 3/4 |

Table 1 shows a mere example of MCS levels, and the number of indices and the modulation and coding schemes associated with the indices are subject to change.

Figure 3:
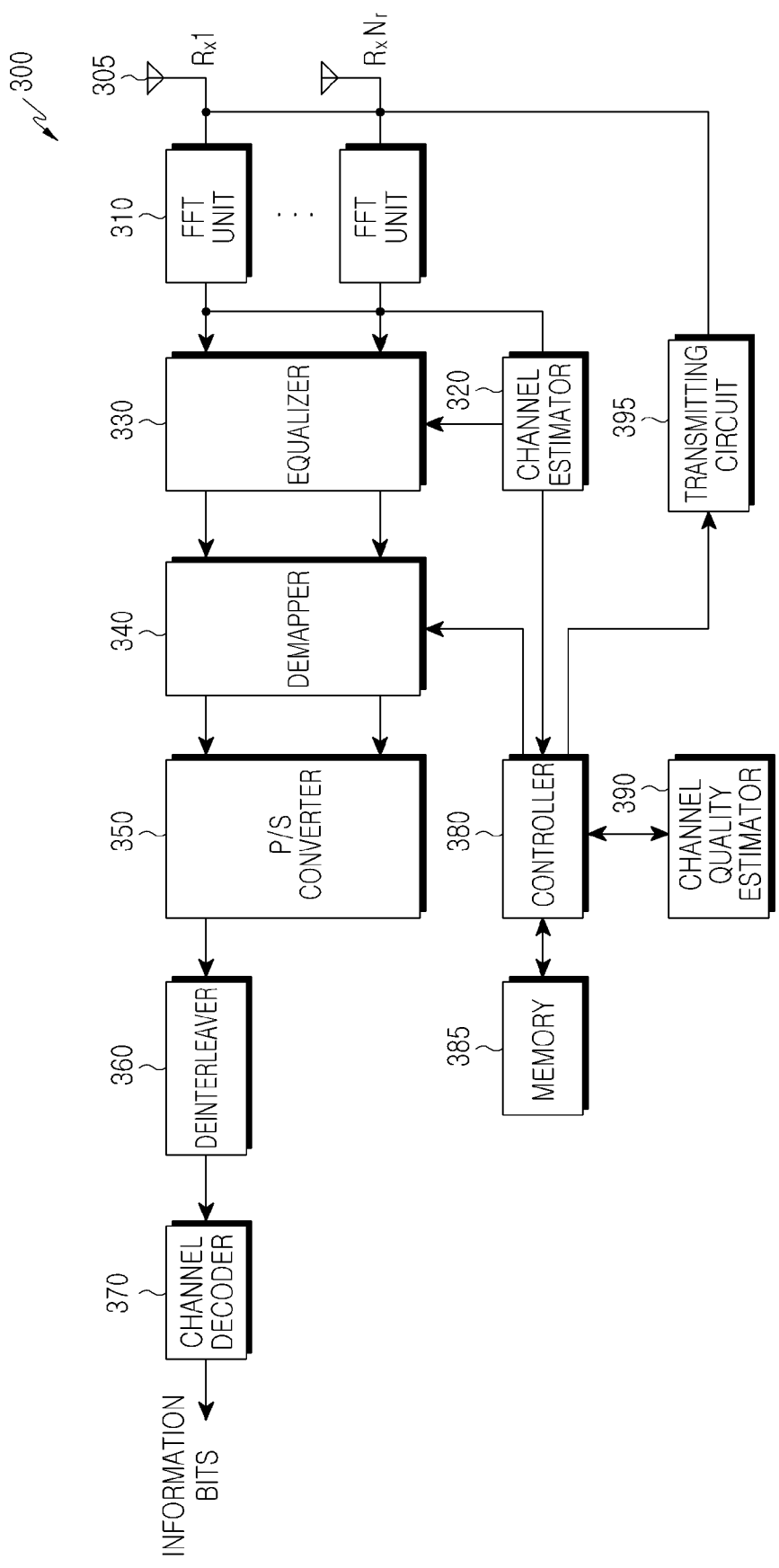
FIG. 3 shows a structure of a UE in a MIMO-OFDM system according to an embodiment of the present invention.

FIG. 3 is a block diagram showing a UE in a MIMO-OFDM system according to an embodiment of the present invention.

Referring to FIG. 3, a UE 300 includes multiple antennas 305, Fast Fourier Transform (FFT) units 310, a channel estimator 320, an equalizer 330, a demapper 340, a Parallel-to-Serial (P/S) converter 350, a deinterleaver 360, a channel decoder 370, a controller 380, a memory 385, a channel quality estimator 390, and a transmitting circuit 395. Other components of the UE 300, which are not related to the present invention, will be omitted herein for simplicity.

Signals received from the multiple antennas 305 are digitalized, from which CPs are removed by CP removers (not shown). The CP-removed samples are converted into frequency-domain symbols after undergoing FFT in the FFT units 310.

The channel estimator 320 estimates channel information by extracting pilot symbols from the outputs of the FFT units 310. The channel information may be a channel estimation response. The equalizer 330 equalizes the symbols using the estimated channel information. In an embodiment of the present invention, it is assumed that an MLD is used as the equalizer 330.

The demapper 340 is controlled by the controller 380 to demap the symbols to the coded data. A demodulation scheme provided by the controller 380 corresponds to the modulation scheme that the AMC controller 260 in the BS 200 provides to the mappers 240.

The P/S converter 350 converts parallel signals output from the demapper 340 into a serial signal, and outputs the serial signal to the deinterleaver 360. The deinterleaver 360 performs deinterleaving on the serial signal output from the P/S converter 350 based on the interleaving pattern used in the BS 200. The channel decoder 370 is controlled by the controller 380 to decode the deinterleaved data. The channel decoder 370 outputs estimated data bits. A decoding scheme provided by the controller 380 corresponds to the coding scheme that the AMC controller 380 in the BS 200 provides to the channel encoder 210.

The controller 380 controls the overall operation of the UE 300, and selects an MCS level capable of maximizing throughput of the system based on the channel quality estimated by the channel quality estimator 390.

The memory 385 may store a look-up table with respect to MCS levels. The look-up table may be the same as the look-up table stored in the memory 290 of the BS 200. The controller 380 determines an index of the determined MCS level referring to the look-up table.

The transmitting circuit 395 receives channel quality information from the controller 380, and transmits it to the BS 200 via the multiple antennas 305. While there are many different examples of the channel quality information, including an SNR and an MCS level index, the UE 300 according to an embodiment of the present invention may minimize load of transmission channels by feeding back only the MCS level indices.

The channel quality estimator 390 estimates the channel quality considering an influence on time delay of channels and using the channel information provided by the channel estimator 320. The channel quality may include a Signal to Noise Ratio (SNR), a Bit Error Rate (BER) or a Block Error Rate (BLER).

The below-described method according to an embodiment of the present invention is a channel quality estimation method for the AMC scheme, and may be implemented by the channel quality estimator 390.

A detailed description will now be made of a method for estimating a BER or a BLER, which is a channel quality (or link-level performance), to determine an AMC scheme in a receiver (or UE) 300 of the MIMO-OFDM system with a maximum likelihood detector.

First, in an $N_t \times N_r$ OFDM system with $N_t$ transmit antennas and $N_r$ receive antennas, a received signal at a k-th subcarrier after the FFT demodulation may be expressed as $$y_k = H_k s_k + w_k \quad (1)$$

where $y_k$ represents a received signal vector with length $N_r$, $H_k$ is a channel matrix with size $N_r \times N_t$, whose (m,n)-th element stands for a channel coefficient between an m-th transmit antenna and an n-th receive antenna at a k-th subcarrier, $s_k$ denotes a transmitted signal vector with $E[s_k s_k^\dagger] = E_s I_{N_t}$, and $w_k$ stands for a Additive White Gaussian Noise (AWGN) vector whose covariance matrix is $E[w_k w_k^\dagger] = E_0 I_{N_r}$.

The receiver 300 should estimate a BLER to determine an MCS level for applying the AMC scheme. Once the BLER is estimated, an expected throughput for the system corresponding to the MCS level is computed as $$\Re_{T,i} = (1 - P_i) N_t R_{c,i} \log_2 M_i \text{ bps/Hz} \quad (2)$$

where $P_i$, $R_{c,i}$ and $M_i$ represent an estimated BLER, a channel coding rate and a modulation level (or modulation order) for an i-th MCS level, respectively. The receiver 300 compares the expected throughputs for all MCS levels, determines an index of the MCS level with the largest expected throughput, and transmits the determined index of the MCS level to a transmitter (or BS) 200 over a feedback channel.

Through Equation (2), it can be appreciated that accurate estimation of the BLER is required in order to precisely compute the expected throughput for the MCS level in the receiver 300. That is, accurate estimation of the channel quality is required to increase efficiency of the AMC scheme.

For accurate estimation of the BLER, an exemplary embodiment of the present invention uses the EESM technique. The EESM technique is derived based on Union-Chernoff bound of the pairwise error probability (PEP) for Binary Phase Shift Keying (BPSK) transmission in SISO systems, and may be generalized to higher-order modulation in OFDM systems.

An effective SNR eSNR of the generalized EESM is expressed as $$\Gamma_{eff} = -\beta ln\left(\frac{1}{N_c}\sum_{k=1}^{N_c}\exp\left(-\frac{\gamma_k}{\beta}\right)\right) \quad (3)$$

where $\gamma_k$ indicates a k-th element of $\bar{\gamma}$, which denotes a set of instantaneous SNRs for all subcarriers. A parameter $\beta$ is dependent on the modulation level and coding rate, so it may be generally found from the link-level simulation.

The effective SNR in the EESM technique is then used to estimate the BLER from the basic AWGN link performance (or AWGN reference model) instead of directly finding the BLER for a given channel condition. That is, in the EESM technique, the BLER may be estimated by mapping the effective SNR to the AWGN reference model.

Figure 4A:
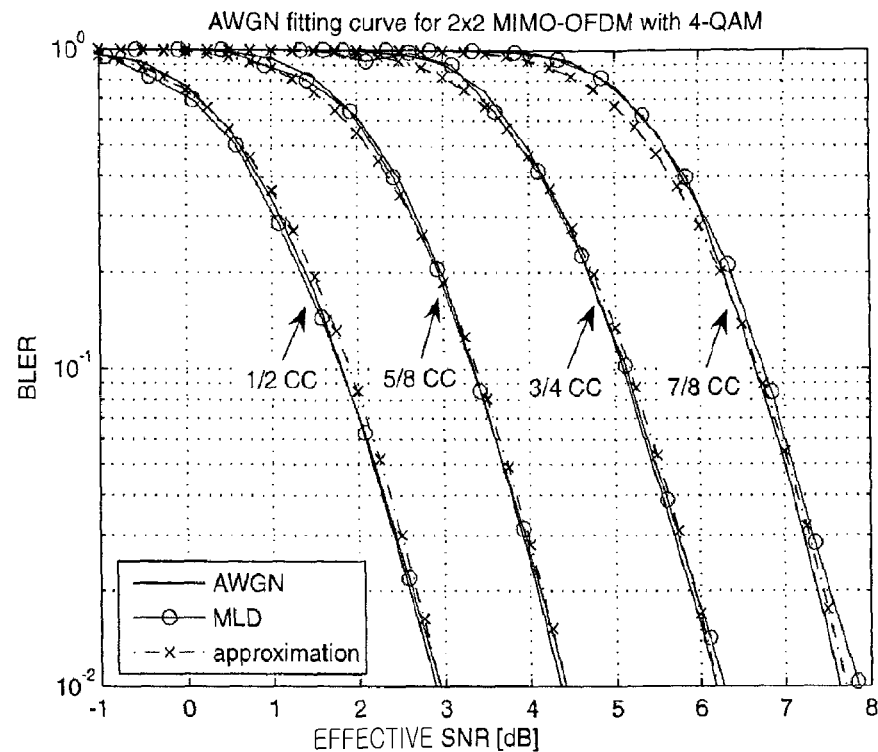
FIG. 4A shows simulation results for fitting performance of BLER curves in a 2×2 MIMO-OFDM system.
Figure 4B:
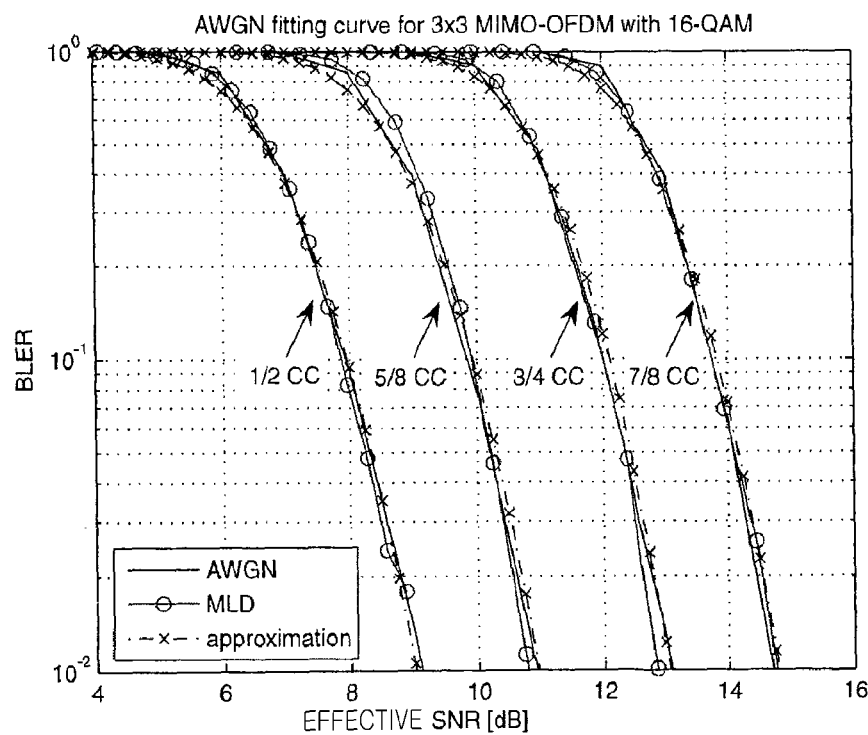
FIG. 4B shows simulation results for fitting performance of BLER curves in a 3×3 MIMO-OFDM system.

For example, referring to FIGS. 4A and 4B, the BLER based on the effective SNR may be estimated using an AWGN reference curve. In order to estimate the BLER through the EESM technique, the following approximate equivalence should be fulfilled for any channel conditions:

$$BLER(\bar{\gamma}) \approx BLER_{AWGN}(\Gamma_{eff}) \quad (4)$$

where $BLER(\bar{\gamma})$ indicates an actual BLER for a given channel condition $\bar{\gamma}$ and $BLER_{AWGN}(\bullet)$ stands for the AWGN reference curve.

Since the BLER is estimated using the effective SNR in the EESM technique, it is important to compute a reliable effective SNR in order to estimate an accurate BLER.

Meanwhile, if the EESM technique is applied to MIMO-OFDM systems, the effective SNR may be computed as:

$$\Gamma_{eff} = F_{EESM}(\bar{\gamma}) \equiv -\beta ln\left(\frac{1}{N_t N_c}\sum_{m=1}^{N_t}\sum_{k=1}^{N_c}\exp\left(-\frac{\gamma_{km}}{\beta}\right)\right) \quad (5)$$

Here, the SNR set $\bar{\gamma}$ consists of SNR values which can be distinguished by subcarrier indices $N_c$ and substream indices $N_t$, and $\gamma_{km}$ is defined as an instantaneous SNR value for an m-th substream and a k-th subcarrier in MIMO-OFDM systems.

Hereinbelow, a description will be given of an effective SNR computation method proposed in the present invention using Equation (5) above.

The effective SNR computation method for MIMO-MLD systems proposed by the present invention needs two optimization parameters with simpler computation. One is a tuning factor $\beta$ for representing the EESM technique, and the other is a penalty factor or a gain factor which indicates the performance relation between the MIMO-MLD systems and other systems.

The effective SNR computation method for MIMO-MLD systems may define an upper bound and a lower bound of the MIMO-MLD systems, and compute a desired effective SNR using the performance of the MIMO-MLD systems and the relation between the two bounds.

First, a ZF receiver is considered as the lower bound of the MIMO-MLD system. The ZF receiver is a typical linear equalizer, and generates a higher data detection error compared to the maximum likelihood detector. Since an output signal of the ZF receiver may be considered as SISO systems, an SNR can be easily obtained.

Meanwhile, other types of linear equalizers such as an MMSE receiver may be used as the lower bound of the MIMO-MLD system. That is, a receiver having a lower performance than the maximum likelihood detector may be used to define the lower bound of the MIMO-MLD system.

Denoting $D_k$ as a ZF filter for a k-th subcarrier, the $D_k$ may be expressed as $$D_k = [d_{k,1} d_{k,2} \ldots d_{k,N_t}] = H_k(H_k^\dagger H_k)^{-1} \quad (6)$$

where $d_{k,m}$ indicates an m-th column vector of Dk.

Applying $D_k^\dagger$ to the received symbol vector $y_k$ in Equation (1), an output signal $z_{k,m}$ of the ZF filter for an m-th substream and a k-th subcarrier becomes $$z_{k,m} = d_{k,m}^\dagger y_k = s_{k,m} + v_{k,m} \quad (7)$$

where $s_{k,m}$ is an m-th element of the transmit signal vector sk and $v_{k,m} = d_{k,m}^\dagger w_k$ denotes an m-th filtered noise sample with $E[|v_{k,m}|^2] = \|d_{k,m}^\dagger\|^2 N_0$.

In the ZF receiver, an instantaneous SNR $\gamma_{ZF,km}$ for an m-th subframe and a k-th subcarrier can be computed as:

$$\gamma_{ZF,km} = \frac{E_s}{\|d_{k,m}^\dagger\|^2 N_0} \quad (8)$$

An effective SNR for the MIMO system with the ZR receiver may be computed as follows by substituting $\bar{\gamma}_{ZF}$ to Equation (5)

$$\Gamma_{ZF,eff} = F_{EESM}(\bar{\gamma}_{ZF}) \quad (9)$$

where $\bar{\gamma}_{ZF}$ denotes a set of instantaneous SNRs for all substreams and subcarriers.

Next, the upper bound of the MIMO-MLD system is defined. As the upper bound, a Perfect Interference Cancellation (PIC) receiver is assumed, which is a MIMO system that can completely remove the interference. Meanwhile, as the upper bound of the MIMO-MLD system, other receivers may be assumed such as a Successive Interference Cancellation (SIC) receiver. That is, a receiver having a higher performance than the maximum likelihood detector may be used to define the upper bound of the MIMO-MLD system.

A signal model of the ideal MIMO system for the m-th data detection and the k-th subcarrier may be expressed as $$y_k^{(m)} = h_{k,m} s_{k,m} + w_k \quad (10)$$

where $h_{k,m}$ indicates an m-th column vector of a channel matrix Hk and $y_k^{(m)}$ denotes a signal vector with the interference being perfectly removed as $$y_k^{(m)} = y_k - \sum_{j \neq m} h_{k,j} s_{k,j}.$$

In Equation (10), each data symbol $s_{k,m}$ may be detected from the Maximum Ratio Combining (MRC) solution. Therefore, in the PIC receiver, an instantaneous SNR $\gamma_{PIC,km}$ for an m-th subframe and a k-th subcarrier becomes $$\gamma_{PIC,km} = \frac{\|h_{k,m}\|^2 E_s}{N_0} \quad (11)$$

The SNR value identical to Equation (11) may be obtained in MIMO-MLD systems when a condition of $H_{k,m}^\dagger h_{k,j}=0$ is satisfied for all $j \neq m$. When all columns of the channel matrix $H_k$ are orthogonal, each data symbol may be detected individually from the MRC operation without any interference.

For the ideal PIC system, the detection performance of $y_k^{(m)}$ may be represented as a single SNR value of the MRC, and this may be considered as the upper bound of the MIMO-MLD system.

In the same way as the ZF receiver, an effective SNR $\Gamma_{PIC,eff}$ for the PIC system may be computed as $$\Gamma_{PIC,eff} = F_{EESM}(\bar{\gamma}_{PIC}) \quad (12)$$

where $\bar{\gamma}_{PIC}$ indicates a set of instantaneous SNRs for whole subcarriers and substreams in PIC systems.

Observing the computing equations of $\Gamma_{PIC,eff}$ and $\Gamma_{ZF,eff}$, it can be noted that the same value of β is used as the EESM tuning factor. In fact, the value of β depends on the channel, modulation level and coding rates. However, it turns out that this factor is not affected by the receiver structure in MIMO systems. In other words, it is possible to precisely fit the BLER curves of MIMO-MLD systems to the AWGN curve with the same β regardless of receiver structures when the same modulation level and the coding rate are used. Based on this fact, the same β may be employed for both ZF and PIC systems when obtaining the effective SNR of MIMO-MLD systems in the MIMO-MLD systems according to an embodiment of the present invention.

If the upper bound and the lower bound of the MIMO-MLD systems are determined, an instantaneous SNR for obtaining the effective SNR of the MIMO-MLD systems is evaluated using the determined bounds.

Since the performance of the MIMO-MLD system is better than that of the MIMO-ZF system, and worse than that of the MIMO-PIC system, the relation between the above systems for all substreams and subcarriers may be expressed as Equation (13) below. Here, the system performance may be expressed as an instantaneous SNR.

$$\gamma_{ZF,km} \leq \gamma_{MLD,km} \leq \gamma_{PIC,km} \quad (13)$$

where $\gamma_{MLD,km}$ denotes an instantaneous SNR for an m-th substream and a k-th subcarrier in the MIMO-MLD system, and the equality holds when all columns of the channel matrix $H_k$ are orthogonal.

In order to compute $\gamma_{MLD,km}$ using $\gamma_{ZF,km}$ and $\gamma_{PIC,km}$, it is assumed that the performance gap between two systems has a constant ratio regardless of the channel condition, and the ratio is written by $$\frac{\gamma_{PIC,km} - \gamma_{MLD,km}}{\gamma_{MLD,km} - \gamma_{ZF,km}} = \eta \quad (14)$$

where η indicates a positive constant.

From Equation (14), an instantaneous SNR of the MIMO-MLD system may be computed as a weighted sum of $\gamma_{ZF,km}$ and $\gamma_{PIC,km}$, as follows:

$$\gamma_{MLD,km} = \frac{1}{1+\eta}\gamma_{PIC,km} + \frac{\eta}{1+\eta}\gamma_{ZF,km} \quad (15)$$

Defining $P_{km} = \gamma_{PIC,km} - \gamma_{ZF,km}$ as the difference between instantaneous SNRs of two bounds, Equation (15) may be rewritten by $$\gamma_{MLD,km} = \gamma_{PIC,km} - K \cdot P_{km} \quad (16)$$

where $$K = \frac{\eta}{1+\eta}$$

stands for a penalty factor.

Equation (16) indicates that the link performance of the MIMO-MLD system may be expressed by the SNR difference from the ideal PIC system.

Regarding $P_{km}$, it can be noted that this quantity dynamically reflects the current channel condition. For example, when all columns of the channel matrix $H_k$ are orthogonal, the $P_{km}$ becomes zero. As a result, $\gamma_{MLD,km}$, $\gamma_{ZF,km}$ and $\gamma_{PIC,km}$ in Equation (13) have the same value regardless of the penalty factor.

For this reason, the computation method of Equation (16) is referred to as a Dynamic SNR Penalty (DSP) technique.

Meanwhile, the instantaneous SNR $\gamma_{MLD,km}$ of the MIMO-MLD system may be expressed as follows, which is different from Equation (16).

$$\gamma_{MLD,km} = \gamma_{ZF,km} + K' \cdot P_{km} \quad (17)$$

where $$K' = \frac{1}{1+\eta}$$

denotes a gain factor, and the same result as the DSP technique may be acquired.

For example, in 2×2 MIMO systems, $P_{km}$ may be directly obtained by $$P_{km} = \frac{E_s |h_{k,1}^\dagger h_{k,2}|^2}{N_0 \|h_{k,3-m}\|^2} \text{ for } m = 1, 2 \quad (18)$$

Also, in 3×3 MIMO systems, $P_{km}$ may be obtained from the channel matrix $H_k$ as follows $$P_{km} = \frac{E_s}{N_0}\left(\|h_{k,m}\|^2 - \det(H_k^\dagger H_k)/C_{km}\right) \text{ for } m = 1, 2, 3 \quad (19)$$

where det(•) stands for a determinant operation, and $C_{km} = \|h_{k,\{m\}_3}\|^2 \|h_{k,\{m+1\}_3}\|^2 - \|h_{k,\{m\}_3}^\dagger h_{k,\{m+1\}_3}\|^2$ with $\{x\}_3 = (x \mod 3)+1$.

Using the DSP technique, an instantaneous SNR for the MIMO-MLD system for all substreams and subcarriers may be computed. In addition, by substituting the computed instantaneous SNR to Equation (5), an effective SNR for the MIMO-MLD system may be computed as $$\Gamma_{MLD,eff} = F_{EESM}(\bar{\gamma}_{MLD}) \quad (20)$$

where $\bar{\gamma}_{MLD}$ is denoted as a set of all $\gamma_{MLD,km}$.

Referring to Equation (5), Equation (16) and Equation (20), it can be noted that two optimization parameters of a tuning factor β and a penalty factor K are needed to compute the effective SNR for the MIMO-MLD system. The tuning factor β and the penalty factor K may be preset through link performance simulation and then stored in the memory 385.

A BLER of the MIMO-BLD system may be estimated using the effective SNR and Equation (4). That is, the BLER that is the link-level performance of the MIMO-MLD system may be estimated by mapping the effective SNR to the AWGN reference curve.

The AWGN reference curve may be previously set and then stored in the memory 385. It is possible to eliminate the burden of storing AWGN reference curves in the memory 385 by approximating the AWGN reference curves with a parametric function.

That is, using two parameters, the AWGN reference curve $BLER_{AWGN,i}(x)$ for an i-th MCS level may be approximated as $$BLER_{AWGN,i}(x) \approx \frac{1}{2}\text{erfc}(A_i x + B_i) \quad (21)$$

where erfc(x) indicates a complementary error function defined by $$\frac{2}{\sqrt{\pi}} \int_x^\infty e^{-t^2} dt,$$

and the parameters Ai and Bi for the i-th MCS level may be numerically found and listed in a table. As shown in FIGS. 4A and 4B, it can be appreciated that the BLER approximation curve is almost identical to the AWGN reference curve.

By substituting the effective SNR to Equation (21), an estimated BLER for each MCS level may be expressed as $$P_i = \frac{1}{2}\text{erfc}(A_i \Gamma_{MLD,eff} + B_i) \quad (22)$$

The tuning factor β, the penalty factor K, and the parameters $A_i$ and $B_i$ for each MCS level required to acquire link performance of the MIMO-MLD systems need to be preset as shown in Table 2 and then stored in the memory 385.

Table 2 shows a mere example of optimization parameters for 2×2 and 3×3 MIMO-OFDM systems, and it would be obvious to those skilled in the art that different values may be set.

If the BLER for each MCS level is estimated, the expected throughput of the system corresponding to the MCS level may be computed using Equation (2).

The receiver 300 compares the expected throughputs for all MCS levels and transmits an index of an MCS level with the largest expected throughput to the transmitter 200 over the feedback channel.

Using the methods described above, the MIMO system with a maximum likelihood detector may compute the effective SNR required to apply the AMC scheme, and may determine an MCS level for obtaining goodput based on the computed effective SNR.

FIGS. 4A and 4B show fitting performance of BLER curves in 2×2 and 3×3 MIMO-OFDM systems, respectively.

Referring to FIGS. 4A and 4B, it could be understood that AWGN reference curves and AWGN approximation curves based on various different coding rates are almost identical. It can also be appreciated that the BLER curves of the MIMO-MLD system obtained by the proposed method are almost equal to the AWGN reference curves and the AWGN approximation curves. In other words, the above results prove that assumptions for the fixed ratio (η in Equation (14)) between SNR differences are effective for all system configurations.

Figure 5A:
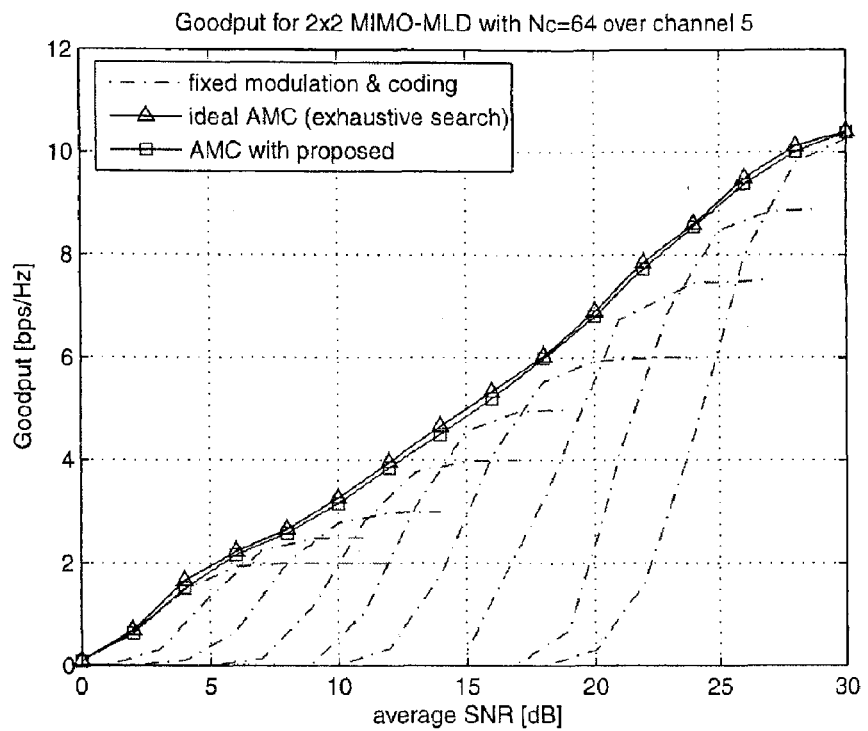
FIG. 5A shows simulation results for goodput based on different AMC schemes in a 2×2 MIMO-OFDM system.
Figure 5B:
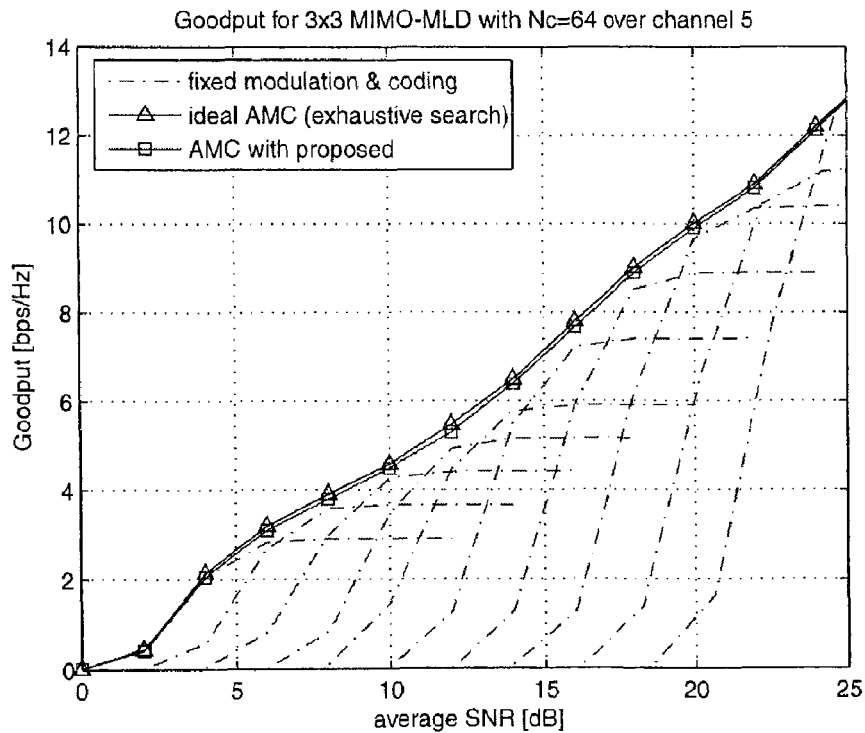
FIG. 5B shows simulation results for goodput based on different AMC schemes in a 3×3 MIMO-OFDM system.

FIGS. 5A and 5B show goodput performance based on different AMC schemes in 2×2 and 3×3 MIMO-OFDM systems, respectively.

Referring to FIGS. 5A and 5B, it is noted that the goodput that can be obtained using the proposed DSP technique is almost equal to the goodput by the ideal AMC technique. Also, the DSP technique may significantly reduce the complexity by providing simple computation.

The present invention may be implemented by hardware, software, or a combination thereof. In hardware implementation, the present invention may be implemented by an Application Specific Integrated Circuit (ASIC) designed to perform the above-mentioned features, a Digital Signal Processing (DSP), a Programmable Logic Device (PLD), a Field Programmable Gate Array (FPGA), a processor, a controller, a microprocessor and other electronic units, or by a combination thereof. In software implementation, the present invention may be implemented by a module carrying out the above-described features. The software may be stored in a

TABLE 2

Optimized Parameters for 2 × 2 and 3 × 3 MIMO-OFDM Systems with MLD

| Code rate | Modulation | 2 × 2 MIMO-MLD system | | | | 3 × 3 MIMO-MLD system | | | |
|---|---|---|---|---|---|---|---|---|---|
| ($R_{c,i}$) | ($M_i$) | β | K | $A_i$ | $B_i$ | β | K | $A_i$ | $B_i$ |
| 1/2 | 4-QAM | 2.4 dB | 0.54 | 0.72 | −0.47 | 2.4 dB | 0.53 | 0.74 | −0.60 |
| 5/8 | 4-QAM | 2.4 dB | 0.56 | 0.72 | −1.53 | 2.4 dB | 0.52 | 0.74 | −1.72 |
| 3/4 | 4-QAM | 2.8 dB | 0.58 | 0.72 | −2.82 | 2.6 dB | 0.52 | 0.74 | −3.05 |
| 7/8 | 4-QAM | 2.9 dB | 0.60 | 0.72 | −3.91 | 2.6 dB | 0.52 | 0.74 | −4.21 |
| 1/2 | 16-QAM | 8.5 dB | 0.84 | 0.69 | −4.51 | 8.5 dB | 0.81 | 0.70 | −4.67 |
| 5/8 | 16-QAM | 9.0 dB | 0.84 | 0.69 | −5.82 | 9.0 dB | 0.78 | 0.72 | −6.25 |
| 3/4 | 16-QAM | 9.2 dB | 0.80 | 0.69 | −7.31 | 9.2 dB | 0.75 | 0.76 | −8.29 |
| 7/8 | 16-QAM | 9.6 dB | 0.82 | 0.69 | −8.50 | 9.5 dB | 0.73 | 0.77 | −9.75 |
| 1/2 | 64-QAM | 13.2 dB | 0.94 | 0.60 | −6.74 | 13.2 dB | 0.91 | 0.60 | −6.89 |
| 5/8 | 64-QAM | 14.5 dB | 0.94 | 0.60 | −8.15 | 14.5 dB | 0.90 | 0.62 | −8.56 |
| 3/4 | 64-QAM | 15.5 dB | 0.90 | 0.60 | −9.68 | 15.5 dB | 0.88 | 0.63 | −10.36 |
| 7/8 | 64-QAM | 15.8 dB | 0.88 | 0.60 | −10.82 | 15.8 dB | 0.86 | 0.69 | −12.77 | memory unit, and executed by a processor. As for the memory unit and processor, various means known to those skilled in the art may be adopted.

As is apparent from the foregoing description, the present invention may compute an effective SNR required to apply AMC and may determine an MCS level for obtaining goodput based on the computed effective SNR in a MIMO system with a maximum likelihood detector.

In addition, by providing an EESM-based channel quality estimation method, the present invention may rapidly derive the link performance estimate based on the current channel state, making it possible to feed back an index of the relevant MCS level.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a modulation and coding scheme in a Multiple Input Multiple Output system with a Maximum Likelihood Detector (MIMO-MLD), comprising: determining an upper bound and a lower bound of a Signal to Noise Ratio (SNR) for the MIMO-MLD, and computing an effective Signal to Noise Ratio (eSNR) using a relation between the upper bound and the lower bound; estimating a channel quality using the eSNR; and determining a modulation and coding scheme using the estimated channel quality, wherein a ratio of a value determined by subtracting the SNR for the MIMO-MLD from the upper bound to a value determined by subtracting the lower bound from the SNR for the MIMO-MLD is a constant.

2. The method of claim 1, wherein the upper bound of the SNR for the MIMO-MLD is an SNR of a MIMO system with a detector having an SNR greater than or equal to an SNR of the maximum likelihood detector, and the lower bound of the SNR for the MIMO-MLD is an SNR of a MIMO system with a detector having an SNR less than or equal to an SNR of the maximum likelihood detector.

3. The method of claim 2, wherein the upper bound of the SNR for the MIMO-MLD is determined by, $$\gamma_{PIC,km} = \frac{\|h_{k,m}\|^2 E_s}{N_0}$$

where $\gamma_{PIC,km}$ denotes an instantaneous SNR for an m-th subframe and a k-th subcarrier in a MIMO-Perfect Interference Cancellation (MIMO-PIC) receiver, and $h_{k,m}$ denotes an m-th column vector of a channel matrix $H_k$.

4. The method of claim 2, wherein the lower bound of the SNR for the MIMO-MLD is determined by, $$\gamma_{ZF,km} = \frac{E_s}{\|d_{k,m}^\dagger\|^2 N_0}$$

where $\gamma_{ZF,km}$ denotes an instantaneous SNR for an m-th subframe and a k-th subcarrier in a MIMO-Zero Forcing (MIMO-ZF) receiver, $d_{k,m}$ denotes an m-th column vector of a ZF filter $D_k$, and $(\cdot)^\dagger$ denotes a conjugate transpose.

5. The method of claim 1, wherein the SNR for the MIMO-MLD and the relation between the upper bound and the lower bound satisfy, $$\frac{\gamma_{UpperBound,km} - \gamma_{MLD,km}}{\gamma_{MLD,km} - \gamma_{LowerBound,km}} = \eta$$

where $\eta$ denotes a positive constant.

6. The method of claim 1, wherein the computing an eSNR comprises:
computing an SNR for the MIMO-MLD using the relation between the upper bound and the lower bound; and
computing an effective SNR by using an Exponential Effective SIR Mapping (EESM) technique for the computed SNR.

7. The method of claim 6, wherein the SNR for the MIMO-MLD is computed by, $$\gamma_{MLD,km} = \gamma_{Upper\,Bound,km} - K \cdot P_{km}$$

or $$\gamma_{MLD,km} = \gamma_{Lower\,Bound,km} + K' \cdot P_{km}$$

where $P_{km} = \gamma_{Upper\,Bound,km} - \gamma_{Lower\,Bound,km}$, $$K = \frac{\eta}{1+\eta}$$

denotes a penalty factor, and $$K' = \frac{1}{1+\eta}$$

denotes a gain factor.

8. The method of claim 7, wherein the eSNR for the MIMO-MLD is computed by, $$\Gamma_{eff} = F_{EESM(\gamma)} \triangleq -\beta \ln\left(\frac{1}{N_t N_c} \sum_{m=1}^{N_t} \sum_{k=1}^{N_c} \exp\left(-\frac{\gamma_{km}}{\beta}\right)\right)$$

where $\gamma_{km}$ denotes an instantaneous SNR for an m-th substream and a k-th subcarrier in a MIMO-Orthogonal Frequency Division Multiplexing (MIMO-OFDM) system, $N_c$ denotes a subcarrier index, $N_1$ denotes a substream index, and $\beta$ denotes a tuning factor.

9. The method of claim 8, wherein the tuning factor $\beta$, the penalty factor K or the gain factor K' required to compute an eSNR for the MIMO-MLD are preset using link performance simulation.

10. The method of claim 1, wherein the channel quality indicates at least one of a Bit Error Rate (BER), a Block Error Rate (BLER) and a Frame Error Rate (FER).

11. The method of claim 1, wherein the channel quality is estimated by mapping the eSNR to an Additive White Gaussian Noise (AWGN) reference curve.

12. The method of claim 11, wherein in order to estimate the channel quality, the following approximate equivalence should be fulfilled for any channel conditions, $$BLER(\bar{\gamma}) \approx BLER_{AWGN}(\Gamma_{eff})$$

where $BLER(\bar{\gamma})$ denotes ac actual BLER for a given channel condition $\bar{\gamma}$, and $BLER_{AWGN}(\bullet)$ denotes the AWGN reference curve.

13. An apparatus for determining a modulation and coding scheme in a Multiple Input Multiple Output system with a Maximum Likelihood Detector (MIMO-MLD), comprising: a channel quality estimator for determining an upper bound and a lower bound of a Signal to Noise Ratio (SNR) for the MIMO-MLD, computing an effective Signal to Noise Ratio (eSNR) using a relation between the upper bound and the lower bound, and estimating a channel quality using the eSNR; and a controller for determining a modulation and coding scheme using the estimated channel quality, wherein a ratio of a value determined by subtracting the SNR for the MIMO-MLD from the upper bound to a value determined by subtracting the lower bound from the SNR for the MIMO-MLD is a constant.

14. The apparatus of claim 13, wherein the upper bound of the SNR for the MIMO-MLD is an SNR of a MIMO system with a detector having an SNR greater than or equal to an SNR of the maximum likelihood detector, and the lower bound of the SNR for the MIMO-MLD is an SNR of a MIMO system with a detector having an SNR less than or equal to an SNR of the maximum likelihood detector.

15. The apparatus of claim 13, wherein the channel quality estimator computes an SNR for the MIMO-MLD using the relation between the upper bound and the lower bound, and computes an effective SNR by using an Exponential Effective SIR Mapping (EESM) technique for the computed SNR.

16. The apparatus of claim 13, wherein the channel quality indicates at least one of a Bit Error Rate (BER), a Block Error Rate (BLER) and a Frame Error Rate (FER).

17. The apparatus of claim 13, wherein the channel quality is estimated by mapping the eSNR to an Additive White Gaussian Noise (AWGN) reference curve.

* * * * *